(12) United States Patent
Jochim et al.

(10) Patent No.: US 9,676,347 B2
(45) Date of Patent: Jun. 13, 2017

(54) INTERLOCK MECHANISM FOR A TOILET FOR VEHICLES IN PARTICULAR FOR BUSSES, MOBILE HOMES, CARAVANS, AND YACHTS, AS WELL AS A TOILET

(71) Applicant: Dometic GmbH, Siegen (DE)

(72) Inventors: Tim Jochim, Wilnsdorf (DE); Jens Oxenfarth, Ennepetal (DE)

(73) Assignee: Dometic GmbH, Siegen (DE)

( * ) Notice: Subject to any disclaimer, the term of this patent is extended or adjusted under 35 U.S.C. 154(b) by 844 days.

(21) Appl. No.: 13/622,499

(22) Filed: Sep. 19, 2012

(65) Prior Publication Data

US 2013/0081200 A1    Apr. 4, 2013

(30) Foreign Application Priority Data

Sep. 20, 2011 (DE) ........................ 10 2011 113 813

(51) Int. Cl.
    *E03D 1/00*    (2006.01)
    *B60R 15/04*   (2006.01)
(52) U.S. Cl.
    CPC ................... *B60R 15/04* (2013.01)
(58) Field of Classification Search
    CPC .................. E03D 7/00; E03D 11/11
    USPC .............. 4/471, 476, 483, 459, 315
    See application file for complete search history.

(56) References Cited

U.S. PATENT DOCUMENTS

| 1,067,096 A | 7/1913 | Cochran |
| 3,570,018 A * | 3/1971 | Sargent .............................. 4/323 |
| 3,611,446 A | 10/1971 | Howard |
| 3,801,991 A | 4/1974 | Fulton et al. |
| 3,938,201 A | 2/1976 | McGrew |
| 4,091,475 A * | 5/1978 | Hewson .................... E03D 7/00 251/177 |
| 4,173,800 A | 11/1979 | Flegel et al. |
| 4,439,875 A | 4/1984 | Stewart et al. |
| 4,578,831 A | 4/1986 | Mellinger et al. |

(Continued)

FOREIGN PATENT DOCUMENTS

| AU | 20120227236 | 9/2012 |
| AU | 2012227236 | 4/2015 |

(Continued)

OTHER PUBLICATIONS

IP Australia; Patent Examination Report No. 1 for Application No. 2012227236 Apr. 9, 2014.
Transmittal Letter of Related Cases Jan. 23, 2017.

*Primary Examiner* — Lauren Crane
(74) *Attorney, Agent, or Firm* — Middleton Reutlinger; James E. Cole

(57) ABSTRACT

The invention relates to an interlock mechanism (71) for a toilet (1) for vehicles, in particular for busses, mobile homes, caravans, and yachts, having an upper part (2) with a toilet bowl (7) and a support part (3) with a cassette compartment (14), wherein a cassette (15) can be inserted into the cassette compartment (14). A passing part (4) is disposed between the toilet bowl (7) and the cassette (15) in the inserted state (EZ). The passing part (4) can be closed by a passing part closure (5). According to the invention, the interlock mechanism (71) can be coupled with the passing part closure (5) and the cassette (15). The invention further relates to a toilet having such an interlock mechanism and a method for operating it.

19 Claims, 8 Drawing Sheets

(56) References Cited

U.S. PATENT DOCUMENTS

| | | |
|---|---|---|
| 4,734,943 A | 4/1988 | Mellinger et al. |
| 4,864,664 A | 9/1989 | Higgins |
| 4,987,616 A | 1/1991 | Ament |
| 5,031,249 A | 7/1991 | Sargent |
| 5,063,616 A | 11/1991 | Bresnahan |
| 5,067,181 A | 11/1991 | Hafner et al. |
| 5,204,999 A | 4/1993 | Makita et al. |
| 5,341,521 A | 8/1994 | Redford |
| 5,355,537 A | 10/1994 | Redford |
| 5,446,928 A | 9/1995 | Daniels |
| 5,502,845 A | 4/1996 | Hayashi et al. |
| 5,887,294 A | 3/1999 | Yeung |
| 5,918,325 A | 7/1999 | Arita et al. |
| 6,189,161 B1 * | 2/2001 | Rijn ............... B60R 15/04 4/321 |
| 6,367,095 B2 | 4/2002 | Hubatka et al. |
| 6,421,843 B1 | 7/2002 | Mellinger et al. |
| 6,470,505 B1 | 10/2002 | Boisvert |
| 6,668,391 B1 | 12/2003 | Lee et al. |
| 6,944,891 B2 | 9/2005 | Kuru et al. |
| 7,004,508 B1 | 2/2006 | Flynn et al. |
| 7,293,298 B2 * | 11/2007 | Cameron ........... B60R 15/04 137/615 |
| 7,305,721 B2 | 12/2007 | Matsui et al. |
| 7,383,593 B2 | 6/2008 | Campbell |
| 7,721,359 B2 | 5/2010 | Tsutsui et al. |
| 8,230,531 B2 | 7/2012 | Miller et al. |
| 2004/0068785 A1 | 4/2004 | Tomita et al. |
| 2005/0015871 A1 | 1/2005 | Tomita et al. |
| 2005/0166308 A1 | 8/2005 | Miwa et al. |
| 2006/0200898 A1 | 9/2006 | Kuru et al. |
| 2007/0113331 A1 | 5/2007 | Prokopenko et al. |

FOREIGN PATENT DOCUMENTS

| | | |
|---|---|---|
| DE | 4116486 | 1/1993 |
| DE | 102004035853 A1 | 2/2006 |
| DE | 202007002270 | 5/2007 |
| DE | 102011113813 | 3/2013 |
| EP | 2484560 | 8/2012 |
| EP | 2572940 | 9/2012 |
| EP | 2572940 | 3/2013 |
| EP | 2842811 | 10/2015 |
| EP | 2843142 | 6/2016 |
| FR | 2771432 A1 | 5/1999 |
| JP | 04327617 A | 11/1992 |
| WO | 9927203 A1 | 6/1999 |
| WO | 9958777 A1 | 11/1999 |
| WO | 0134918 A1 | 5/2001 |
| WO | 03014483 A1 | 2/2003 |
| WO | 2005033423 A2 | 4/2005 |
| WO | 2008031083 A1 | 3/2008 |

* cited by examiner

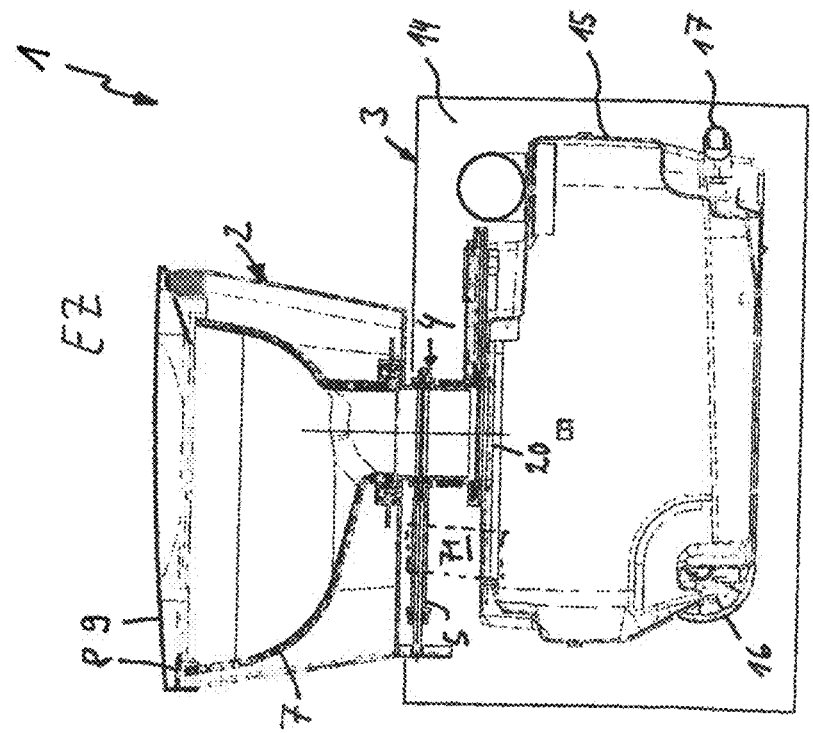
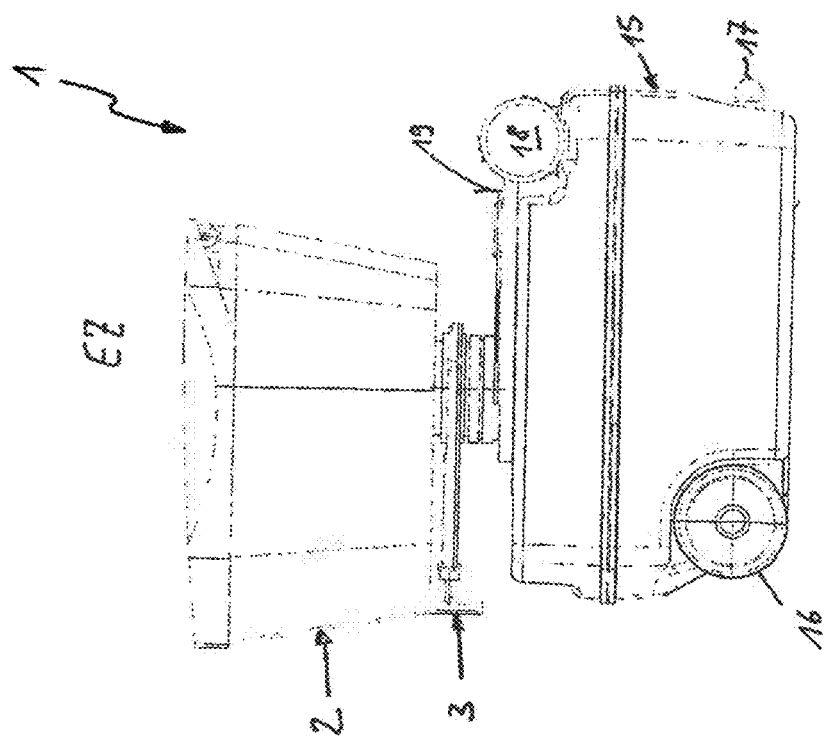

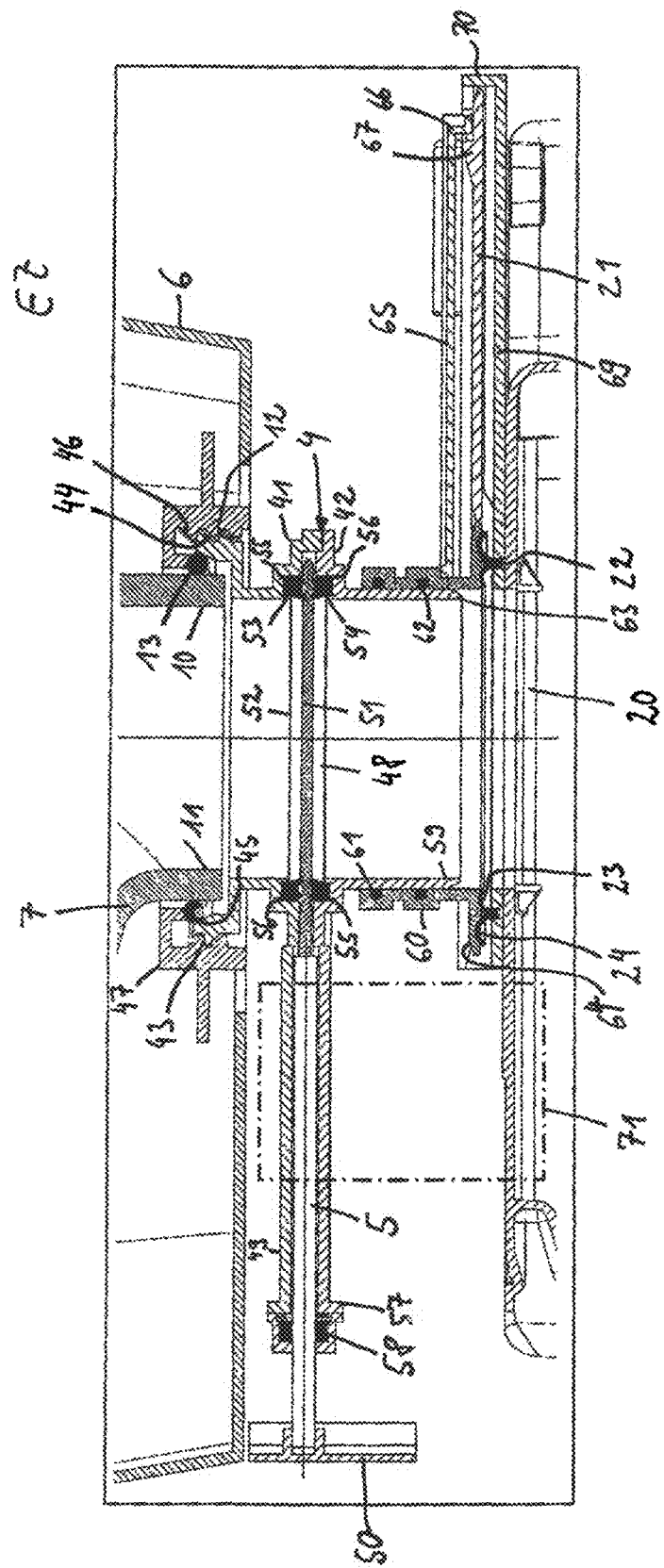

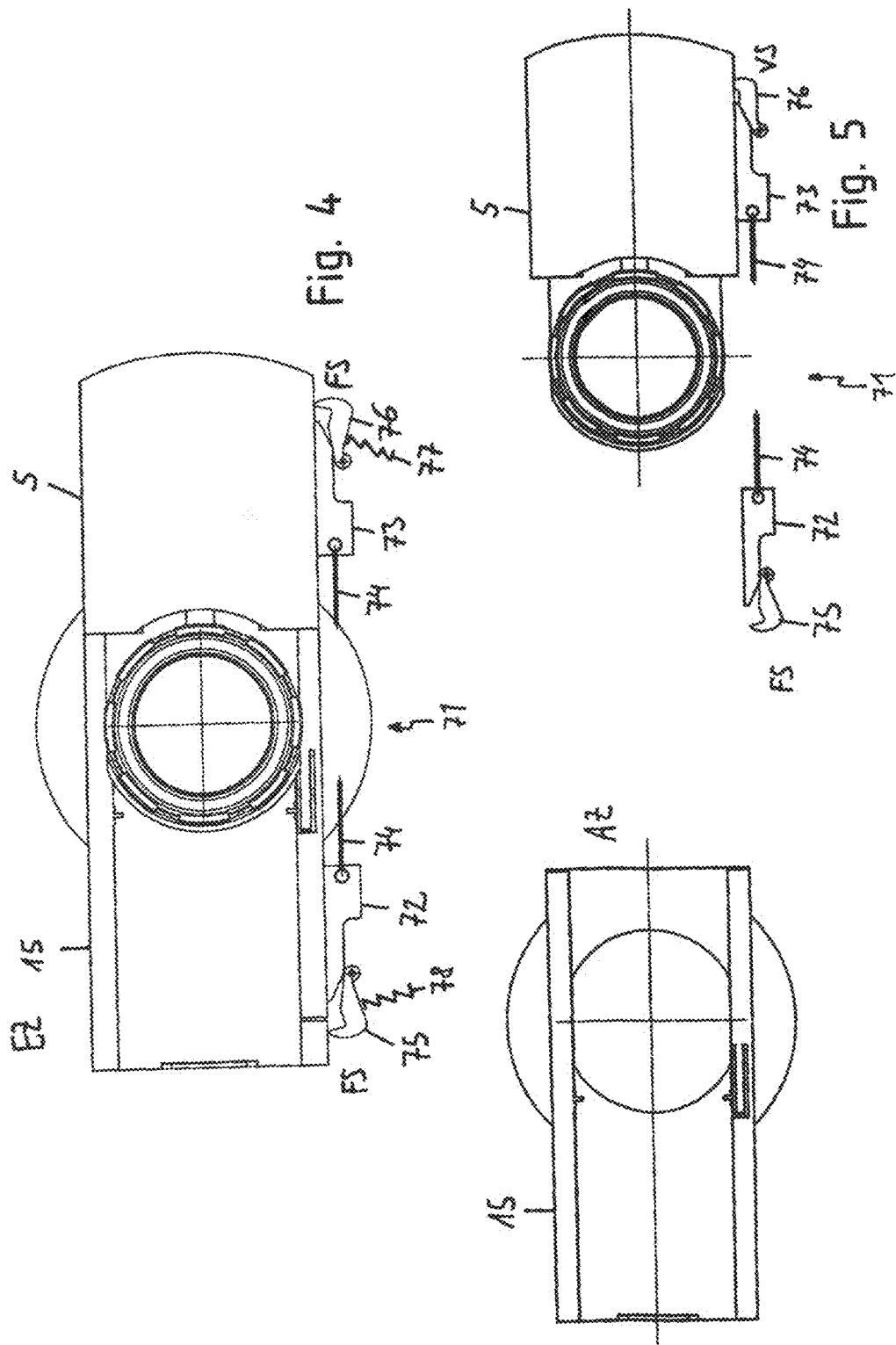

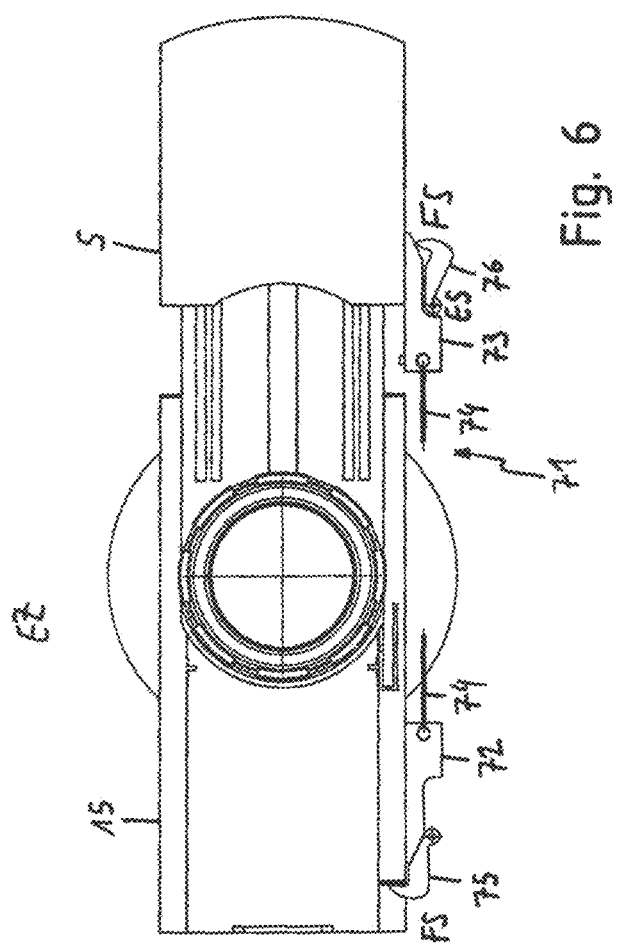

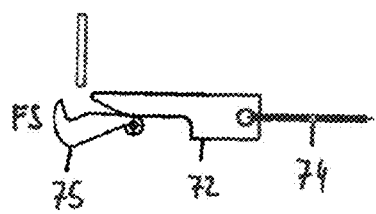 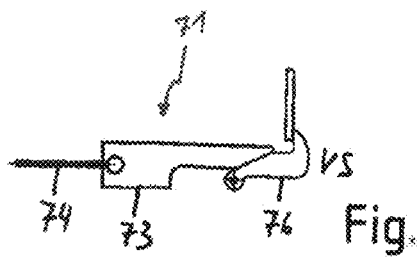
Fig. 7
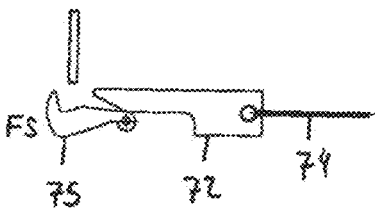 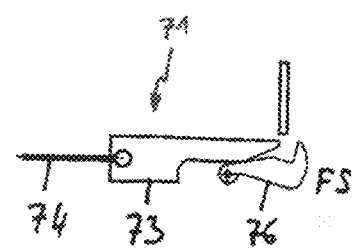
Fig. 8
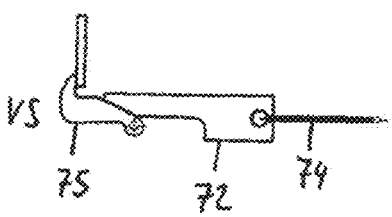 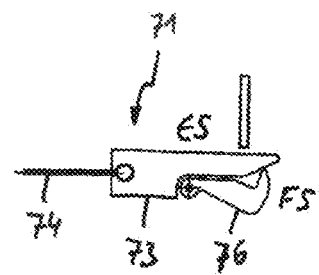
Fig. 9

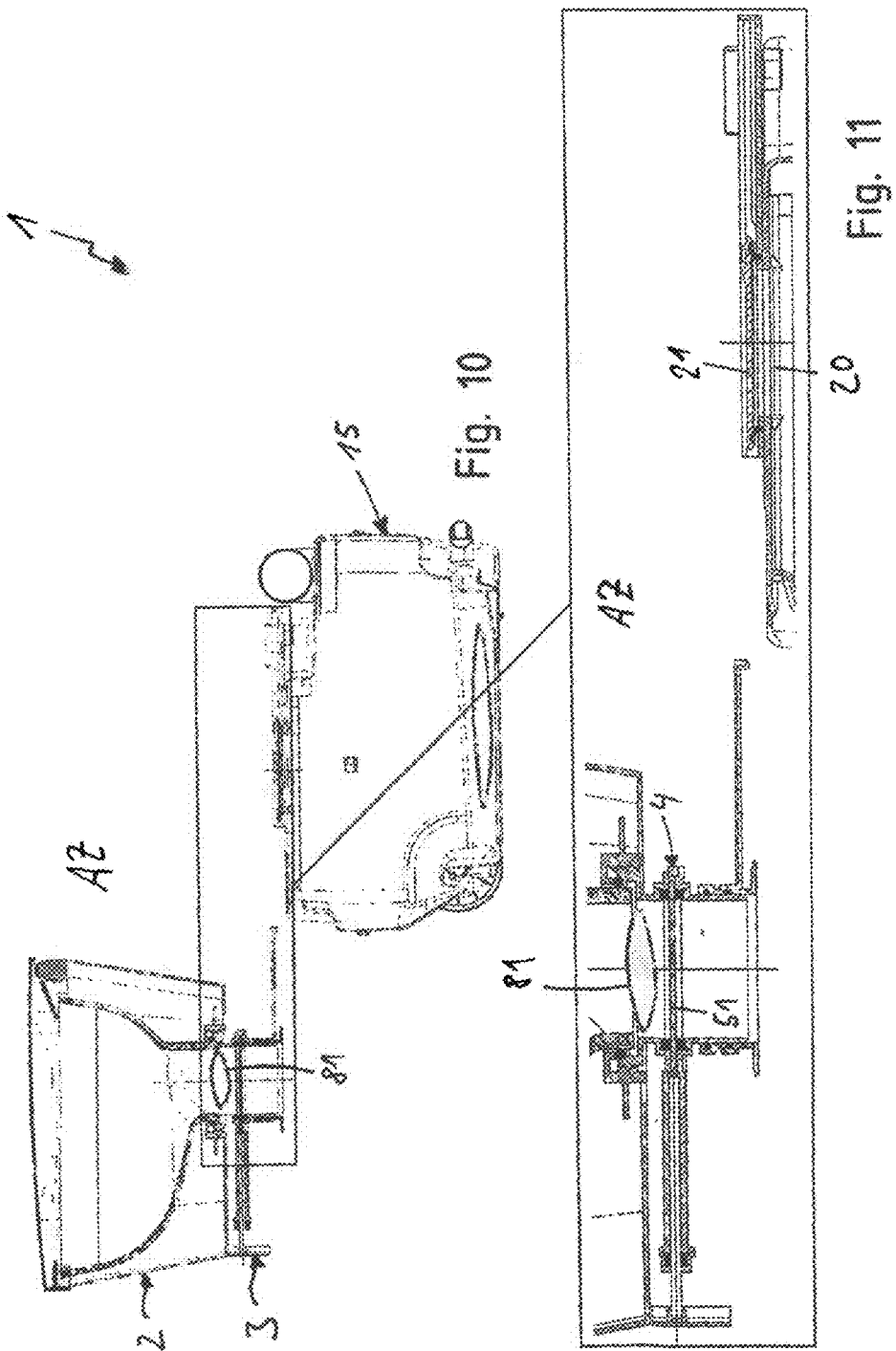

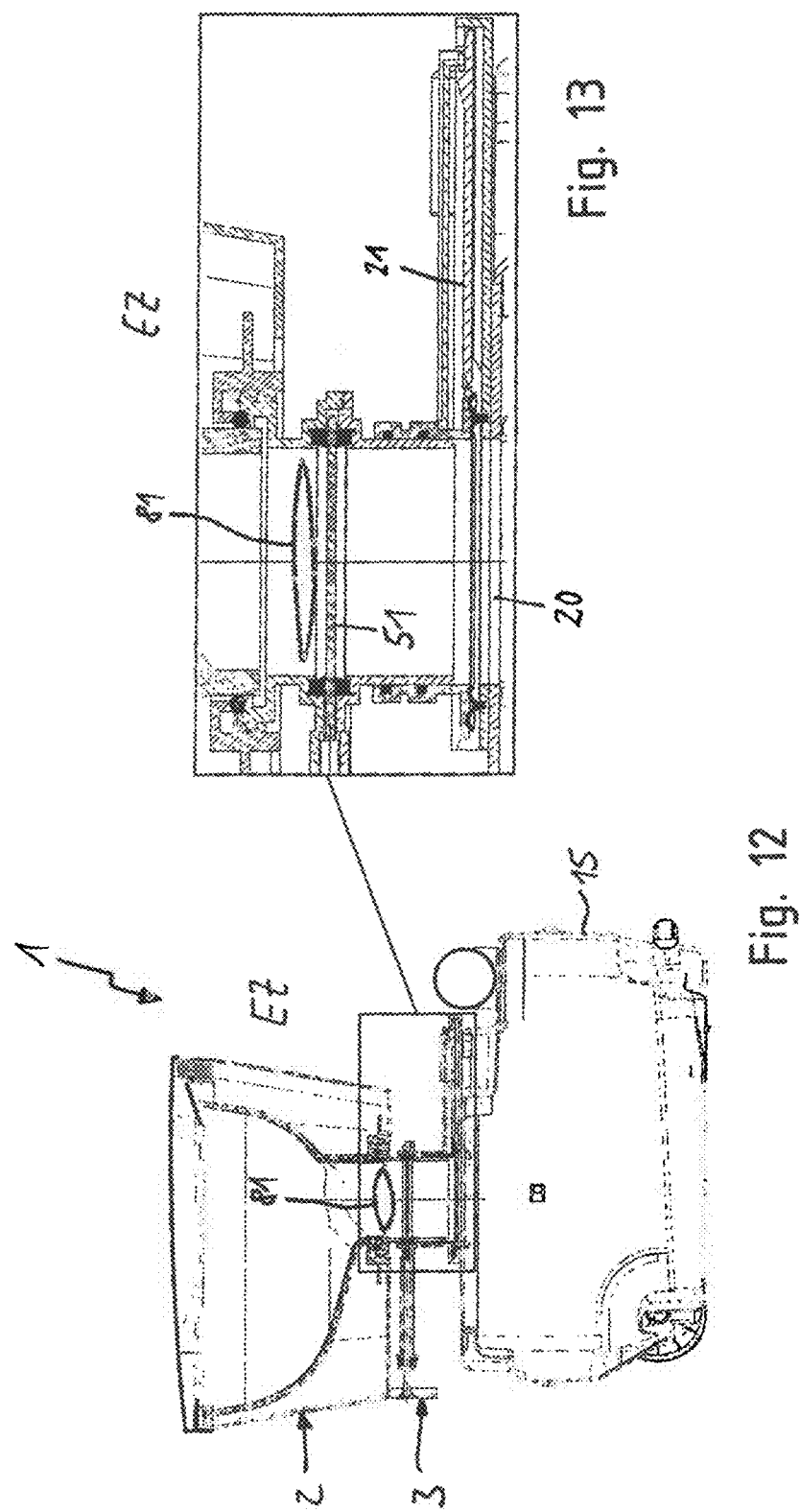

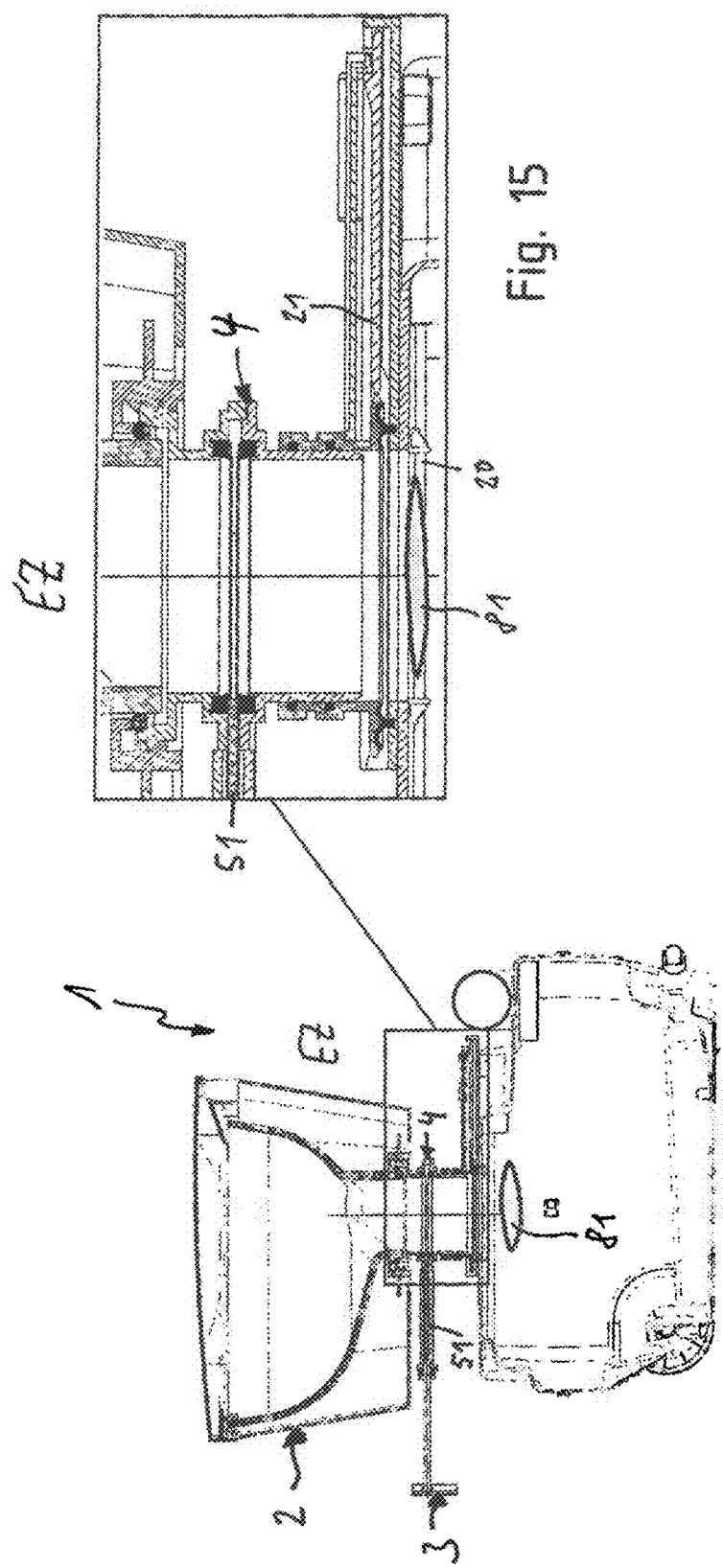

INTERLOCK MECHANISM FOR A TOILET FOR VEHICLES IN PARTICULAR FOR BUSSES, MOBILE HOMES, CARAVANS, AND YACHTS, AS WELL AS A TOILET

The invention relates to an interlock mechanism for a toilet for vehicles, in particular for busses, mobile homes, caravans, and yachts, having an upper part with a toilet bowl and a support part with a cassette compartment, wherein a cassette can be inserted into the cassette compartment. The invention further relates to a toilet having such an interlock mechanism and a method for operating it.

Such toilets are known in the prior art as cassette toilets, inter alia. These are installed into vehicles in various forms. Here, as a rule, the support part is attached to the vehicles and supports the toilet bowl. A cassette compartment is disposed in the support part into which a cassette can be inserted. The cassette is also referred to as feces tank. Typically, for that a flap is provided in the outer wall of the vehicle so that the cassette can be taken out of or inserted into the vehicle, respectively, from the outside. The cassette has an inlet through which liquids and feces can be introduced from the toilet bowl into the cassette. The inlet of the cassette is sealed by one or more inlet covers and thus, can be closed liquid-tight and odor-tight. In part, in known toilets in the support part or the toilet bowl there are provided devices for relocating the inlet cover when the cassette is inserted into the cassette compartment and for opening the inlet of the cassette to introduce feces and liquids.

It was found detrimental with the known toilets that the toilet bowl is not sealed at its outlet when the cassette has been pulled out of the cassette compartment. When the toilet is used in this state inadvertently or the toilet bowl still contains residual liquids, respectively, e.g. from a flushing channel, the excrements or liquids, respectively, fall through the outlet of the toilet bowl into the cassette compartment or onto an underlying vehicle floor which is often made of wood. Then, the contaminants have to be removed with difficulty. Also, the contaminants may cause damages of the vehicle. Furthermore, there is a substantial risk of injury when the toilet bowl is purified and by doing so a part of the body is passed through the toilet bowl outlet and at the same time the cassette is inserted. This can lead to injuries of the body part.

Thus, taking the prior art as starting point, the object of the invention is to provide an interlock mechanism for a toilet for vehicles, a toilet, and a method for operating it, wherein liquids and solids can only drain out of the toilet bowl if the cassette is in the inserted state, and in addition a safer and more reliable operation of the toilet is ensured.

This object is solved by an interlock mechanism for a toilet for vehicles having the features of claim 1. Practical embodiments of the interlock mechanism result from claims 2 to 8. The toilet according to the invention results from claim 9. Practical embodiments of the toilet result from claims 10 to 15. The method according to the invention results from claims 16 and 17.

The object is an interlock mechanism for a toilet for vehicles, in particular for busses, mobile homes, caravans, or yachts, having an upper part with a toilet bowl and a support part with a cassette compartment, wherein a cassette can be inserted into the cassette compartment. A passing part is disposed between the toilet bowl and the cassette in the inserted state. The passing part can be closed by a passing part closure. According to the invention, the interlock mechanism can be coupled with the passing part closure and the cassette.

It is the particular advantage of the interlock mechanism according to the invention and the toilet comprising it that in addition to a known inlet cover, also referred to as closing gate, a passing part closure is disposed at the cassette between the toilet bowl and the cassette. Therefore, a double closure is provided comprising the passing part closure and the inlet cover. By the passing part closure liquids and solids can be prevented from draining out of the toilet bowl. With the interlock mechanism according to the invention that can be coupled with the passing closure and the cassette the passing part closure can be locked so that it cannot be opened or closed in the locked state if, for example, the cassette is not in the inserted state. Moreover, with the passing part closure it can be effectively prevented that something is passed, transported, or carried through the toilet bowl outlet when the cassette is pulled out. In this way, possible contaminants, damages, and/or injuries are prevented if something should be passed through the toilet bowl outlet while the cassette is inserted.

More preferably, the interlock mechanism has a closing bar and a cassette bar that can be moved between release positions and locking positions via a cassette dog and closure dog coupled with the cassette dog. This solution gets by on very few and light components. The parts are easy to prepare and can be easily mounted.

Preferably, the interlock mechanism has a closure dog that can be coupled with the passing part closure and a cassette dog that can be coupled with the cassette, wherein the closure dog and the cassette dog are coupled with each other in a motion-transmitting manner. Since the dogs can be coupled with the assigned components it is possible to transmit their movement in a limited area and make a decoupling if the admissible area of motion of the dogs has been exceeded. Moreover, a shifting of a dog can immediately be transmitted to the other even though both are not formed as one piece. Therefore, by pulling out the cassette over the cassette dog and the closure dog it can be effected that the closure bar locks the passing part closure against pulling and vice versa.

Advantageously, the closure dog is engageable into the passing part closure and disengageable by the closure bar. Additionally or instead, the cassette dog can be engageable into the cassette and disengageable by the cassette bar. This measure ensures in a simple manner that the dogs can be relocated by the corresponding components to a limited distance.

For example, the closure dog and the cassette dog are coupled with each other by a coupling member, preferably in the form of a Bowden cable, a rod, a transmission, a servo motor, a linear or rotational guide, a cable pull, a chain drive, or lifting magnet or these dogs are formed as one piece. Preferably, the coupling of the closure dog and the cassette dog is formed such that a rotation of the upper part to the support part is possible. Therefore, the toilet can also be installed in very small bathroom units since for use its upper part along with the toilet seat can be rotated into a suitable position.

It is also preferred that the closure bar and/or the cassette bar are biased by springs. The springs may be formed as return springs moving the bars to the locking position when they are disengaged from the dogs. This arrangement simplifies the installation of the toilet since the bars must no longer be actively moved into the locking positions. Alternatively an embodiment without use of springs is conceivable. Here, the dog drives a gear. When pulling out or inserting the cassette the bar rotates into the opening or closing position.

The toilet for vehicles, in particular for busses, mobile homes, caravans, or yachts according to the invention has an upper part with a toilet bowl and a support part with a cassette compartment. A cassette can be inserted into the cassette compartment, wherein a passing part is disposed between the toilet bowl and the cassette in the inserted state, wherein the passing part can be closed by a passing part closure. The toilet according to the invention comprises the interlock mechanism described above.

In accordance to a particularly preferred embodiment of the invention the interlock mechanism is coupled with the passing part closure and the cassette.

Preferably, the interlock mechanism is formed such that the passing part closure can only be moved from a closing position if the cassette is in the inserted state. For that, the interlock mechanism can have a bar that can be relocated by the cassette such that a movement of the passing part closure is prevented.

It is further preferred that the interlock mechanism is formed such that the cassette is fixed in the inserted state when the passing part closure is out of the closing position. Also for that, a (further) bar can be used to positively engage into the cassette and to prevent a relocation while the passing part closure is open.

In one embodiment, an inlet cover at the cassette can automatically be opened by inserting the cassette into the cassette compartment and automatically be closed by pulling the cassette out of the cassette compartment.

Preferably, the passing part closure comprises a slider sword and a slider handle. Here, the slider handle is preferably disposed such that it can be actuated by a person using the toilet such that the slider sword before toileting can be moved from the closing position to an open position and subsequently pushed back again. In principle, an automation of this operation is also conceivable. If the toilet bowl is rotatable the slider handle preferably rotates along with the toilet bowl.

It is advantageous, if the passing part is sealed by a seal relative to the slider sword that is in the closing position. Preferably, two seals are used that are disposed above and below the slider sword. For example, they may be formed as ring seals. The seal(s) ensure(s) that liquids and feces cannot laterally escape from the passing part in the area of the slider sword.

In addition, the passing part can have a slider sword housing. By the slider sword housing, the slider sword is surrounded by the passing part and the slider sword housing, respectively, in any position. Thus, contaminants of the slider sword having passed the seals between the passing part and the slider sword cannot reach the outside.

Preferably, the toilet bowl and the passing part are formed as a one-piece component. Therefore, the passing part can be formed on the toilet bowl. Thus, the number of components of the toilet is reduced and the mounting is simplified.

Preferably, a cassette adapter is disposed at the passing part. In this way, the crossing point to the cassette can be adapted. It is for example possible, to attach different cassette adapters for adaption to different types of cassettes to the passing part.

It is particularly advantageous when the cassette adapter is slidably disposed at the passing part and a seal is provided between the cassette adapter and the passing part. In this way, the distance, e.g. due to manufacturing or production tolerances, between the cassette and the passing part can be adjustably bridged. By slidably arranging the cassette adapter it is even possible to compensate vertical descents between different cassettes that are successively inserted into the cassette compartment. Moreover, the distance between a vertically adjustable toilet bowl and the cassette can also be adjustably bridged in this way.

In a preferred embodiment, the cassette adapter has a cover dog for a slidable inlet cover of the cassette. The cover dog is formed such that it engages with the inlet seal when the cassette is inserted into the cassette compartment. In this way, the inlet cover is held stationary when the cassette is completely inserted into the cassette compartment. Therefore, the inlet cover is pushed away from the inlet port during insertion of the cassette.

Preferably, the dog is biased by a return spring. The return spring ensures that the cover dog is in a starting position when the cassette is pulled out of the cassette compartment. The return spring may be part of a return mechanism. The return mechanism can have a return arm. The return spring can also be formed as a return arm.

It is particularly advantageous when in the inserted state of the cassette the passing part and an inlet port of the cassette align. Therefore, it is ensured that the feces and liquids reach the cassette directly from the toilet bowl without meanwhile being able to escape.

The upper part can be rotatable attached to the support part or a similar component. By the rotatable attachment different structural conditions in the vehicle can be taken into account. So, it is for example possible to install a toilet according to the invention in a cramped bathroom unit and to rotate the upper part along with the toilet bowl out of the way when the bathroom unit is to be used for example as a shower.

In accordance to a further embodiment, the cassette can be inserted into the cassette compartment. In the following, the method according to the invention is described wherein the sequence of the steps according to the invention starts with inserting the cassette into the cassette compartment. However, this selected start of the sequence of steps is not mandatory. Rather, the start of the described sequence of steps according to the invention can also be done with the cassette being already located in the cassette compartment and its effects on the interlock mechanism or also with the removal of the cassette located in the cassette compartment and the resulting effects on the interlock mechanism. Also, the thus chosen start of the sequence of steps of the method according to the invention is not limiting and may rather be in every single step depending on the initial state of the toilet.

In the method for operating the toilet according to the invention, in a first step initially inserting the cassette into the cassette compartment takes place. Along with inserting the cassette at the same time and automatically the release of the inlet port of the cassette takes place. Here, the inlet cover of the cassette is affected such that it is moved from its closing position in which the inlet port of the cassette is preferably odor and liquid-tight sealed into an open position.

After the cassette has been inserted into the cassette compartment the cassette immediately acts upon the interlock mechanism according to the invention. Thereby, the interlock mechanism is actuated and the passing part closure is released. Hence, the toilet can be used as needed. The cassette is locked against removal by the interlock mechanism in its position in the cassette compartment while moving the passing part closure from a closing position for closing the passing part into an open position for opening the passing part is possible. In this respect, the toilet can now be used and feces and other toilet contents after opening the passing part closure reach the cassette through the passing part. By locking the cassette it is ensured in an advantageous manner that it cannot be removed from the cassette compartment while the toilet is or at least can be used.

After using the toilet, the passing part closure is moved in its closing position again such that the passing part closure acts upon the interlock mechanism. This is also required if the cassette is to be removed from the cassette compartment for example for emptying. By actuating the interlock mechanism the cassette is released by the interlock mechanism. At the same time, the passing part closure is locked in the closed position of the passing part closure. Then, in case of need, the cassette can be removed from the cassette compartment. When the cassette is removed from the cassette compartment, the interlock mechanism according to the invention effects that the passing part closure is locked in the closing position. Thus, it is ensured in an advantageous manner that with the cassette removed the toilet cannot be used since the passing part closure cannot be opened. Even if the toilet would now be used, it would be prevented by the passing part closure in the closing position that feces and the like can reach the empty cassette compartment. Moreover, also inserting other objects or body parts through the passing part into the cassette compartment is effectively prevented.

If the cassette is removed from the cassette compartment, the inlet port of the cassette is automatically closed by acting upon the inlet cover of the cassette, so that it is preferably odor and liquid-tight sealed again.

In the following, the invention is explained in more detail with respect to an example shown in the figures. Here:

FIGS. 1 and 2 show a simplified representation of the toilet according to the invention in cross-section and in a side elevation;

FIG. 3 shows the toilet of FIG. 1 with the passing part closure being illustrated enlarged in cross-section and in detail;

FIGS. 4 to 9 show the interlock mechanism in top views;

FIGS. 10 and 11 show the toilet of FIG. 1 after the cassette has been pulled out;

FIGS. 12 and 13 show the toilet of FIG. 1 with the passing part closure being shown in the closing position; and FIGS. 14 and 15 show the toilet of FIG. 1 with the passing part closure and the inlet cover of the cassette being open.

In FIGS. 1 to 15, the interlock mechanism according to the invention and the toilet 1 for vehicles, in particular for busses, mobile homes, caravans, and yachts according to the invention are each partially shown. Toilet 1 has an upper part 2 and a support part 3 with only the passing part 4 with the passing part closure 5 of the support part 3 being shown. The upper part 2 comprises a housing 6 wherein a toilet bowl 7 is disposed. At the upper part 2 a toilet seat 8 and a toilet lid 9 are rotatably attached. The toilet bowl 7 has a toilet bowl outlet 11 at a lower end 10. In the area of the toilet bowl outlet 11 the upper part 2 is rotatably and vertically adjustable supported at the support part 3 via a thread 12. Between the support part 3 and the toilet bowl outlet 11 a ring seal 13 is provided. The support part 3 comprises the passing part 4 and a cassette compartment 14 into which a cassette 15 can be inserted.

In FIGS. 1 to 4 and 12 to 15, cassette 15 is shown in the completely inserted state EZ each. In FIGS. 10 and 11, cassette 15 is shown in the pulled out state AZ. Cassette 15 is formed as a reservoir for liquids and feces. In order to prevent odor chemical additives can be filled in the cassette 15. In order to facilitate transportation of the cassette 15 to an emptying station the cassette 15 is equipped with two wheels 16 and a telescopically extendable handle 17. Above the handle 17 a discharge pipe 18 is disposed. Cassette 15 has an inlet port 20 at a topside 19. The inlet port 20 can be closed by a horizontally slidable inlet cover 21. A cassette seal 22 is provided at the inlet port 20 which has two arcuately in and outwardly protruding sealing lips 23; 24. With salient inlet cover 21 the inlet port 20 is closed liquid and odor-tight by the cassette seal 22. If the cassette 15 is inserted into the cassette compartment 14 the cassette seal 22 seals the crossing point to the passing part 4.

Passing part 4 is in particular shown in FIG. 3 in more detail. Passing part 4 comprises a passing part top 41 and a passing part base 42 both of which are positively connected to each other. The passing part top 41 has a threaded portion 44 for the upper part 2 of the toilet 1 at an upper end 43 and a seal seat 45 for the ring seal 13 between the passing part top 41 and the toilet bowl 7. The threaded portion 44 engages with a mating thread portion 46 of an intermediate part 47 of the upper part 2. Between the passing part top 41 and the passing part base 42 a guide 48 and a slider sword housing 49 for the passing part closure 5 are formed. By means of a slider handle 50 a slider sword 51 can be relocated in the slider sword housing 49 and the guide 48. The slider sword 51 is sealed in a passing area 52 respectively relative to the passing part top 41 and the passing part base 42 by two ring seals 53, 54. The ring seals 53, 54 have webs 55 engaging with grooves 56 in the passing part top 41 and in the passing part base 42. At a free end 57 of the slider sword housing 49 an additional seal 58 is provided to safeguard the slider sword housing 49 against the escape of liquids and solids, in particular feces. At a lower end 59 of the passing part base 42 a cassette adapter 60 is provided. The cassette adapter 60 is axially slidable disposed at the passing part base 42. Two ring seals 61, 62 are provided between the passing part base 42 and the cassette adapter 60. The cassette adapter 60 has a flange 64 at a lower end 63 at which the cassette seal 22 in the inserted state EZ of the cassette 15 comes to fit. A dog 65 for an inlet cover 21 of the cassette 15 is provided at the side of the cassette adapter 60. When the cassette 15 is inserted into the cassette compartment so a holding portion 66 of the dog 65 engages positively with an engaging nose 67 in the inlet cover and pulls the inlet cover 21 from the inlet port 20 towards the discharge pipe 18. The dog 65 is biased by a return spring. The inlet cover 21 is held at the cassette side in a cover guide 69. On one side the cover guide 69 has an edge web 70 forming an end stop for the inlet cover 21. In the inserted state EZ of the cassette 15 the inlet cover 21 is fixed between the edge web 70 and the cassette adapter 60.

An interlock mechanism 71 is provided between the slider sword 51 and the cassette 15 shown in FIG. 3 by a dash-dotted rectangle.

The interlock mechanism 71 is explained in more detail with respect to FIGS. 4 to 9. The interlock mechanism 71 comprises a cassette dog 72 which can be coupled with the cassette 15 and a closure dog 73 that can be coupled with the passing part closure 5. Both dogs are slidably disposed in the support part 3 and the upper part 2 of the toilet 1, respectively. Moreover, the dogs 72, 73 are coupled with each other by a coupling member 74. In this way, a relocation of one of dogs 72, 73 can be transmitted to the other one of dogs 72, 73. The dogs 72, 73 can be relocated over a short distance to bring them into engagement with a cassette bar 75 and a closing bar 76, respectively. In particular, the dogs 72, 73 are engageable with the passing part closure 5 and the cassette 15, respectively. The dogs 72, 73 are disengaged from the cassette 15 and the passing part closure 5, respectively, by abutting against the respective bars 75, 76 in end positions ES. The bars 75, 76 are biased by springs 77, 78, which move, in particular rotate, them into a locking position VS when they are not in engagement with the corresponding dog 72, 73.

If the cassette 15 and the passing part closure 5 are inserted the cassette dog 72 and the closing dog 73 are in engagement with the closing bar 76 and the cassette bar 75 so that they are held in a release position FS. This state is shown in FIGS. 4 and 8. In this state, cassette 15 or passing part closure 5 can be pulled out.

When pulling out the cassette 15 cassette dog 72 is moved along a short distance with the cassette 15 before it disengages from cassette 15. By moving the cassette dog 72 also the closure dog 73 is relocated via the coupling member 74 such that the closure dog 73 is disengaged from closing bar 76. Then, closing bar 76 is pressed, in particular rotated, by a spring 77 into a locking position VS in which the closing bar 76 prevents the passing part closure 5 from being pulled out. This state is in particular shown in FIGS. 5 and 7.

When the cassette 15 is inserted the cassette dog 72 engages with the cassette 15 on the last section of distance. The movement of the cassette 15 is transmitted via the cassette dog 72 and the coupling member 74 to the closure dog 73 so that the closure dog 73 is engaged with the closing bar 76 and moves the closing bar 76 into the release position FS.

It works just the opposite in pulling out the passing part closure 5. When the passing part closure 5 is pulled out the closure dog 73 is moved over a short distance with the passing part closure 5 before it disengages from the passing part closure 5. By moving the closure dog 73 also the cassette dog 72 is relocated by the coupling member 74 such that the cassette dog 72 is disengaged from the cassette bar 75. Then, the cassette bar 75 is pressed, in particular rotated, by a spring 78 into a locking position VS in which the cassette bar 75 prevents the cassette 15 from being pulled out. This state is shown in FIGS. 6 and 9.

When the passage part closure 5 is inserted the closure dog 73 engages with the passing part closure 5 on the last section of distance. The movement of the passing part closure 5 is transmitted by the closure dog 73 and the coupling member 74 to the cassette dog 72 so that the cassette dog 72 is engaged with the cassette bar 75 and moves the cassette bar 75 into the release position FS.

In this way, the interlock mechanism 71 according to the invention ensures that no liquids and solids 81 can pass through the passing part 4 if there is no cassette 15 inserted into the cassette compartment 14. Additionally, it is ensured that with an open passing part closure 5 the cassette 15 cannot be pulled out of the cassette compartment 14.

REFERENCE NUMBERS

1—toilet
2—upper part
3—support part
4—passing part
5—passing part closure
6—housing
7—toilet bowl
8—toilet seat
9—toilet lid
10—lower end of 7
11—toilet bowl outlet
12—thread
13—ring seal
14—cassette compartment
15—cassette
16—wheel
17—handle
18—discharge pipe
19—top side of 15
20—inlet port
21—inlet cover
22—cassette seal
23—sealing lip
24—sealing lip
41—passing part top
42—passing part base
43—upper end of 41
44—threaded portion
45—seal seat
46—mating thread portion
47—intermediate part
48—guide
49—slider sword housing
50—slider handle
51—slider sword
52—passing area
53—ring seal
54—ring seal
55—web
56—groove
57—free end of 49
58—seal
59—lower end of 42
60—cassette adapter
61—ring seal
62—ring seal
63—lower end of 60
64—flange
65—dog
66—holding portion
67—engaging nose
69—cover guide
70—edge web
71—interlock mechanism
72—cassette dog
73—closing dog
74—coupling member
75—cassette bar
76—closing bar
77—spring
78—spring
81—solid
AZ—pulled out state
ES—end position
EZ—inserted state
FS—release position
VS—locking position

What is claimed is:

1. An interlock mechanism for a toilet for vehicles, having an upper part with a toilet bowl and a support part with a cassette compartment, wherein a cassette can be inserted into the cassette compartment, wherein a passing part is disposed between the toilet bowl and the cassette in the inserted state (IS), wherein the passing part can be closed by a passing part closure, characterized in that the interlock mechanism comprises a closing dog movable with the passing part closure, a cassette dog moveable with the cassette and a coupling member which transmits movement between the cassette dog and the closing dog and wherein when the cassette is removed, the closing dog disengages a closing bar sufficiently that the closing bar precludes movement of the passing part closure in at least one direction.

2. The interlock mechanism according to claim 1, characterized in that the interlock mechanism has the closing bar and the cassette bar that can be moved via the cassette dog and the closing dog coupled with the cassette dog between release positions (RP) and locking positions (LP).

3. The interlock mechanism according to claim 1, characterized in that the interlock mechanism has the closing dog that can be coupled with the passing part closure and the cassette dog that can be coupled with the cassette, wherein the closing dog and the cassette dog are coupled with each other in a motion-transmitting manner.

4. The interlock mechanism according to claim 2, characterized in that the closing dog is engageable and disengageable with the passing part closure by the closing bar.

5. The interlock mechanism according to claim 2, characterized in that the cassette dog is engageable and disengageable with the cassette by the cassette bar.

6. The interlock mechanism according to claim 2, characterized in that the closing dog and the cassette dog are coupled with each other by the coupling member.

7. The interlock mechanism according to claim 6, characterized in that the coupling of the closing dog and the cassette dog is formed such that a rotation of the upper part to the support part is possible.

8. The interlock mechanism according to claim 2, characterized in that the closing bar and the cassette bar are biased by springs.

9. A toilet for vehicles, comprising: an upper part with a toilet bowl and a support part with a cassette compartment, wherein a cassette can be inserted into the cassette compartment, wherein a passing part is disposed between the toilet bowl and the cassette in the inserted state (IS), wherein the passing part can be closed by a passing part closure and comprising an interlock mechanism characterized in that the interlock mechanism comprises a closing dog, a cassette dog and a coupling member coupled with the passing part closure and the cassette so that the coupling member which transmits movement between the cassette dog and the closing dog; and wherein when the cassette is removed, the closing dog disengages a closing bar sufficiently that the closing bar precludes movement of the passing part closure in at least one direction.

10. The toilet according to claim 9, characterized in that the interlock mechanism is coupled with the passing part closure and the cassette.

11. The toilet according to claim 10, characterized in that the interlock mechanism is formed such that the passing part closure can only be moved from a closing position when the cassette is in the inserted state (IS).

12. The toilet according to claim 11, characterized in that the interlock mechanism is formed such that the cassette is fixed in the inserted state (IS) when the passing part closure is out of the closing position.

13. The toilet according to claim 10, characterized in that an inlet cover at the cassette can be opened by inserting the cassette into the cassette compartment and can be closed by pulling the cassette out of the cassette compartment.

14. The toilet according to claim 10, characterized in that the passing part closure comprises a slider sword and a slider handle.

15. The toilet according to claim 13, characterized in that the passing part and an inlet port of cassette align in the inserted state (IS) of the cassette.

16. A method for operating the toilet comprising: a) inserting a cassette into a cassette compartment and releasing an inlet port of the cassette by acting upon an inlet cover of the cassette (15); b) acting of the cassette upon an interlock mechanism having a closing dog, a cassette dog and a coupling member; c) actuating the interlock mechanism and releasing a passing part closure; d) need-based moving of the passing part closure from a closing position for closing a passing part into an open position for opening the passing part and at the same time locking the cassette in the cassette compartment; e) moving the passing part closure into the closing position; f) acting of the passing part closure upon the interlock mechanism; and g) actuating the interlock mechanism for locking the passing part closure in the closing position of the passing part closure and at the same time releasing the cassette for removal from the cassette compartment; wherein when the cassette is removed, the closing dog disengages a closing bar sufficiently that the closing bar precludes movement of the passing part closure in at least one direction.

17. The method for operating the toilet according to claim 16, wherein after step g) there follows removal of the cassette from the cassette compartment and the closure of the inlet port of the cassette by acting upon the inlet cover of the cassette.

18. The interlock mechanism according to claim 2, characterized in that the closing dog and the cassette dog are coupled with each other by at least one of a Bowden cable, a rod, a transmission, a servo motor, a linear or rotational guide, a cable pull, a chain drive, and lifting magnet.

19. The interlock mechanism according to claim 2, characterized in that the closing dog and the cassette dog are formed as one piece.

* * * * *